Oct. 27, 1936.  S. K. HOFFMAN  2,058,452
ATTACHABLE WASHER
Filed Nov. 8, 1934
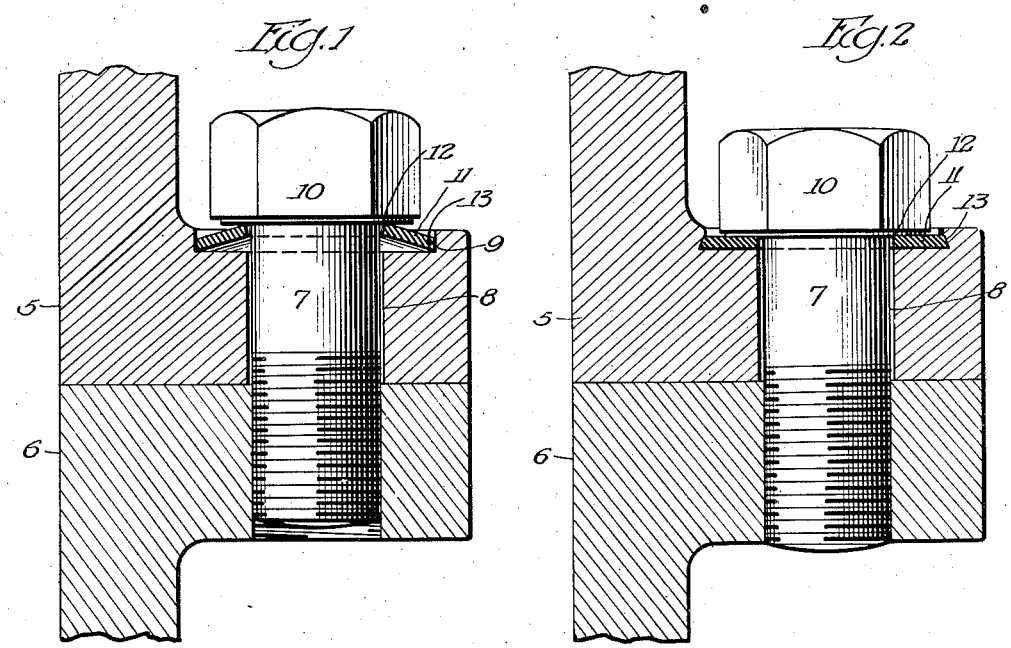
Inventor
Samuel K. Hoffman
By Fred Gerlach
his Atty.

Patented Oct. 27, 1936

2,058,452

UNITED STATES PATENT OFFICE 2,058,452

ATTACHABLE WASHER

Samuel K. Hoffman, Williamsport, Pa., assignor to Lycoming Manufacturing Company, Williamsport, Pa., a corporation of Pennsylvania Application November 8, 1934, Serial No. 752,009

1 Claim. (Cl. 85—50)

The invention relates to the attachment of washers to elements of relatively soft metal.

It is now common practice, when using bolts or screws in elements made of relatively soft metal, such as aluminum and magnesium alloys, to place loose washers between the clamping members such as the heads of screws, bolts or nuts, and the elements of soft metal to prevent the heads or nuts from marring or disfiguring the elements from the rotation of the clamping members and to distribute the clamping pressure over a greater area.

When it is necessary to dismantle such a device for maintenance purposes, the washers are frequently misplaced and time and labor are lost in looking for misplaced washers and selecting the proper sizes for substitution.

One object of the invention is to avoid this objection to loose washers and provide a construction which, when once secured to an element, will be attached thereto and retained thereby in its proper place and, in practical effect, become a permanent part of the element. Such a washer, after it has once been attached in its proper place, will remain properly positioned and attached so that it can not be lost when the bolt or screw is removed.

Another object of the invention is to provide a washer which will become attached to an element by the clamping pressure of the screw or bolt.

These objects are attained primarily by providing the element with a recess to receive a dished washer which will be deformed and marginally expanded to interfit with, or become embedded in, the soft metal of the element by screw pressure when the screw or nut thereon is first tightened in its application to the element.

Other objects of the invention and the various advantages and characteristics of the present washer construction will be apparent from a consideration of the following detailed description.

The invention consists in the several novel features which are hereinafter set forth and are more particularly defined by the claim at the conclusion hereof.

In the drawing:

Fig. 1 is a section showing one form of the invention and illustrating the washer before the screw has been tightened to clamp it into interfitting relation with one of the elements which are to be secured together by the screw. Fig. 2 is a similar view showing the washer attached to and deformed and interlocked as the result of the clamping pressure applied thereto after the screw has been tightened.

The invention is exemplified in connection with two elements 5 and 6 which are to be secured together by a screw 7 which extends through a hole 8 in a flange on one of the elements and is threaded to a flange on the other element. These elements are formed of relatively soft metal, such as aluminum or magnesium alloys, which will become marred by rotation when the head or nut on a screw or bolt is applied. A cylindrical recess 9 is counterbored or spot-faced in that face of element 5 where the clamping pressure of the head 10 of the screw 7 is to be applied. Preferably, this recess is of greater diameter than the head 10, so as to provide a bearing-surface of greater area than the inside area of said head, for distributing the clamping pressure from the head of the screw through the intermediate washer.

The washer 11 is formed of ferrous metal, such as suitable iron, which can be flattened or deformed by screw pressure, will remain set in its deformed shape, and will provide a relatively hard bearing-surface for the head 10. The washer 11 is normally of truncated conoidal form or dished and is provided with a hole 12 for the screw 7 of sufficient diameter to leave some clearance around the shank of the screw 7. The inner periphery of hole 8 is preferably perpendicular to the faces of the washer. The outer periphery of the washer 13 is chamfered or beveled, so that it is normally parallel to the cylindrical wall of the recess and is of such diameter than it fits snugly in the recess. In this form of the invention, the washer is normally of the shape shown in Fig. 1 when it is placed in the recess 9. When the head 10 is turned to draw the screw so it will clamp the elements 5, 6 together, it will exert axial clamping pressure and rotate on the inner portion of the washer. The beveled periphery 13 will be expanded into the cylindrical wall around the recess and undercut the side wall of recess 9. The beveled periphery of the washer deforms or drops into the wall of the recess 9 so it will be undercut. This forms an interfit which locks the washer and the element 5 together, as shown in Fig. 2. During this deformation of the washer its inner periphery will become parallel to the shank of the screw 7. As a result, whenever the screw 7 is removed the washer remains attached to the element 5 and will not be misplaced.

The invention is not to be understood as restricted to the details set forth, since these may be modified within the scope of the appended claim, without departing from the spirit and scope of the invention.

What I claim as new and desire to secure by Letters Patent is:

In combination, a soft metal element provided with a flat face and having a hole therein extending through and leading at right angles from the face, and also having a comparatively shallow cylindrical recess of greater diameter than the hole formed in the aforesaid face and concentrically arranged with respect to the hole, a clamping device having a shank extending through the hole and an enlarged clamp member at one end of the shank and adjacent to the recess, and a continuous hard metal washer having the outer peripheral face thereof fitting substantially flatly against the cylindrical face of the recess and extending substantially parallel to the axis of the clamping member and embodying a central hole of greater diameter than the shank and through which the latter extends, said washer being dished or bulged in the direction of said clamp member and adapted in response to axial movement of the latter toward the recess to flatten and expand marginally in such manner that the outer peripheral face thereof becomes beveled in the direction of the clamp member and forms a tapered undercut in the cylindrical face of the recess whereby the washer becomes permanently attached to the element.

SAMUEL K. HOFFMAN.